(12) United States Patent
Lemke et al.

(10) Patent No.: US 9,689,768 B2
(45) Date of Patent: Jun. 27, 2017

(54) MECHANICAL STABILIZING AND ELECTRICAL AS WELL AS HYDRAULIC ADAPTING OF A SILICON CHIP BY CERAMICS

(71) Applicant: Endress + Hauser GmbH + Co. KG, Maulburg (DE)

(72) Inventors: Benjamin Lemke, Berlin (DE); Rafael Teipen, Berlin (DE); Anh Tuan Tham, Berlin (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 193 days.

(21) Appl. No.: 14/652,959

(22) PCT Filed: Dec. 6, 2013

(86) PCT No.: PCT/EP2013/075764
§ 371 (c)(1),
(2) Date: Oct. 14, 2015

(87) PCT Pub. No.: WO2014/095416
PCT Pub. Date: Jun. 26, 2014

(65) Prior Publication Data
US 2016/0041054 A1 Feb. 11, 2016

(30) Foreign Application Priority Data
Dec. 21, 2012 (DE) .................. 10 2012 113 033

(51) Int. Cl.
*G01L 19/06* (2006.01)
*G01L 13/02* (2006.01)

(52) U.S. Cl.
CPC ........ *G01L 13/025* (2013.01); *G01L 19/0618* (2013.01)

(58) Field of Classification Search
CPC .................. G01L 13/025; G01L 19/0618
See application file for complete search history.

(56) References Cited

U.S. PATENT DOCUMENTS

| | | | |
|---|---|---|---|
| 2,999,386 A * | 9/1961 | Wolfe | G01L 9/0072 73/718 |
| 4,163,395 A | 8/1979 | Medlar et al. | |

(Continued)

FOREIGN PATENT DOCUMENTS

| | | |
|---|---|---|
| CN | 1449489 A | 10/2003 |
| CN | 1672025 A | 9/2005 |

(Continued)

OTHER PUBLICATIONS

English Translation of International Preliminary Report on Patentability, WIPO, Geneva, Jun. 23, 2015.

(Continued)

*Primary Examiner* — David Bolduc
(74) *Attorney, Agent, or Firm* — Bacon & Thomas, PLLC

(57) ABSTRACT

A pressure difference sensor includes a pressure difference measuring cell, which has a measuring cell platform with pressure contactable measuring chambers in its interior, a first mounting surface and a second mounting surface. The mounting surfaces have a variable separation under pressure loading of the measuring chambers. A first reinforcement element with a first planar reinforcement area and a second reinforcement element with a second planar reinforcement area. A deflection of the mounting surfaces due to a pressure loading of the measuring chambers is lessened by the reinforcement elements, wherein especially at least 50% of an effective stiffness $K=1/(dx/dp)$ of the reinforcement elements connected by the pressure difference measuring cell is provided only by these connections of the reinforcement element with the measuring cell platform without additional connections between the reinforcement elements in a par- (Continued)

allel branch, wherein x is the separation between the first mounting surface and the second mounting surface having the greatest pressure dependence dx/dp.

10 Claims, 2 Drawing Sheets

(56) References Cited

U.S. PATENT DOCUMENTS

| | | | | | |
|---|---|---|---|---|---|
| 4,539,850 | A | * | 9/1985 | Ziegler | G01L 13/025 73/706 |
| 4,833,920 | A | * | 5/1989 | Knecht | G01L 9/0073 361/283.3 |
| 5,134,887 | A | * | 8/1992 | Bell | G01L 9/0042 361/283.4 |
| 5,157,972 | A | * | 10/1992 | Broden | G01L 9/0073 29/25.41 |
| 6,631,644 | B2 | | 10/2003 | Burczyk et al. | |
| 7,278,318 | B2 | | 10/2007 | Dannhauer et al. | |
| 7,497,127 | B2 | | 3/2009 | Burczyk et al. | |
| 8,402,836 | B2 | | 3/2013 | Dannhauer et al. | |
| 9,054,222 | B2 | | 6/2015 | Tham et al. | |
| 2002/0108447 | A1 | * | 8/2002 | Burczyk | G01L 19/04 73/716 |
| 2008/0127738 | A1 | * | 6/2008 | Burczyk | G01L 13/026 73/716 |
| 2010/0281992 | A1 | * | 11/2010 | Dannhauer | G01L 9/0073 73/716 |

FOREIGN PATENT DOCUMENTS

| | | |
|---|---|---|
| CN | 101896802 A | 11/2010 |
| DE | 2718873 | 11/1977 |
| DE | 10064871 A1 | 7/2002 |
| DE | 10101180 A1 | 9/2002 |
| DE | 102004017580 A1 | 12/2005 |
| DE | 102011006517 A1 | 10/2012 |
| WO | 02052241 A1 | 7/2002 |
| WO | 02055978 A1 | 7/2002 |

OTHER PUBLICATIONS

International Search Report,, EPO, The Netherlands, Jun. 6, 2014.
German Search Report, German PTO, Apr. 10, 2014.

* cited by examiner

MECHANICAL STABILIZING AND ELECTRICAL AS WELL AS HYDRAULIC ADAPTING OF A SILICON CHIP BY CERAMICS

TECHNICAL FIELD

The present invention relates to a pressure difference sensor, especially a pressure difference sensor having a micromechanical pressure difference measuring cell, composed of a semiconductor material, especially silicon.

BACKGROUND DISCUSSION

Pressure difference measuring cells can experience overloads as a result of high static pressures. Approaches for protecting pressure difference measuring cells against the effects of such overloads are disclosed in Offenlegungsschrift (laid open German application) DE 10 2011 006 517 A1 and the therein cited documents from the state of the art. Described in this Offenlegungsschrift is a two part ceramic capsule, which surrounds a pressure difference measuring cell completely, in order to protect the pressure difference measuring cell in the case of overload. This construction is, however, very complicated, since the system composed of capsule and pressure difference measuring cell is overdetermined. A cavity in the capsule, in which the pressure difference measuring cell is arranged, must have a sufficiently exactly defined depth, which is matched to the thickness of the pressure difference measuring cell, in order effectively to be able to support the pressure difference measuring cell. In such case, of course, also the layer thicknesses of the joining materials are to be taken into consideration, with which the pressure difference measuring cell is held in the capsule. Especially a glass solder is an example of a joining material. As stated, the described approach is basically capable of performing its intended function, however, it is associated with high costs, in order to be able to maintain the small manufacturing tolerances.

SUMMARY OF THE INVENTION

It is, therefore, an object of the present invention to provide a remedy for this situation. It is additionally an object of the present invention to provide a pressure difference sensor exhibiting an effective and lower cost protection of the pressure difference measuring cell.

The object is achieved according to the invention by the pressure difference sensor which includes: a pressure difference measuring cell, wherein the pressure difference measuring cell has a measuring cell platform having a first measuring chamber and a second measuring chamber in its interior, wherein the measuring chambers are separated from one another by a measuring membrane, wherein the measuring cell platform has on a first measuring chamber side a first planar mounting surface facing away from the measuring membrane, wherein the measuring cell platform has on a second measuring chamber side a second planar mounting surface facing away from the measuring membrane, wherein the measuring chambers have, in each case, a measuring chamber opening to the first, respectively second, planar mounting surface, via which they are contactable with a first, respectively second, pressure, wherein the measuring membrane is elastically deformable as a function of a difference between the first pressure in the first measuring chamber and the second pressure in the second measuring chamber, wherein the pressure difference measuring cell has a transducer for providing a signal dependent on the deformation of the measuring membrane, a first reinforcement element having a first planar reinforcement area, wherein there extends through the first reinforcement element a first pressure duct, which opens into the first reinforcement area and communicates with the first measuring chamber opening, wherein the first reinforcement area is pressure bearingly connected with the first mounting surface, a second reinforcement element having a second planar reinforcement area, wherein there extends through the second reinforcement element a second pressure duct, which opens into the second reinforcement area and communicates with the second measuring chamber opening, wherein the second reinforcement area is pressure bearingly connected with the second mounting surface, wherein deflection of the first and second mounting surfaces due to pressure loading of the first and second measuring chambers is lessened by the reinforcement element to no greater than 25% especially no greater than 10%, preferably no greater than 5%, further preferably no greater than 2% and especially preferably no greater than 1% of the deflection of the mounting surfaces of a pressure difference measuring cell of same type without connection with the reinforcement elements, wherein especially at least 50%, preferably at least 70%, further preferably at least 85% and especially preferably at least 95% of an effective stiffness $K=1/(dx/dp)$ of the reinforcement elements connected by the pressure difference measuring cell is provided only by these connections of the reinforcement elements with the measuring cell platform without additional connections between the reinforcement elements in a parallel branch, wherein x is the separation between the first mounting surface and the second mounting surfaces having the greatest pressure dependence $dx/dp$.

The reinforcement of the measuring cell platform assures a pressure resistance of the pressure difference measuring cell in the case of loadings of several 10 MPa, especially loadings greater than 60 MPa. The reinforcement elements comprise, for this, a material with a high E-modulus of greater than 250 GPa, especially greater than 300 GPa.

The pressure difference sensor of the invention is clearly more tolerant of variations of the dimensions of the parts than was the case for the encapsulation according to the state of the art.

In a further development of the invention, the pressure difference sensor is free of additional, direct mechanical connections between the reinforcement elements contributing more than 5%, especially more than 2%, to the stiffness K. I.e., the assembly, reinforcement element-measuring cell platform-reinforcement element is so stably embodied that additional reinforcements can be omitted. This eliminates all problems concerning mechanical over-determination of the seating of the pressure difference measuring cell.

In a further development of the invention, the pressure difference sensor includes, supplementally, at least one additional, direct mechanical connection between the reinforcement elements by means of a connecting body, which has a connecting surface, which is connected with both reinforcement elements, wherein the connecting surface is essentially perpendicular to the mounting surfaces and reinforcement areas. The described direct mechanical connection can occur by joining the connecting surface of the connecting body with side surfaces of the reinforcement elements. In this way, the problem of dimensional accuracy in preparing the participating components is largely removed, because this connection acts basically via tangential, respectively shear, forces between the participating surfaces, so that a matching to the dimensions predetermined by the pressure difference measuring cell and the connecting body is directly possible.

To the extent that additional direct connections are provided between the connecting bodies, such act preferably symmetrically with reference to a central axis of the pressure difference measuring cell, wherein the central axis is perpendicular to the measuring membrane and extends through its center. Thus, the pressure difference sensor according to a further development of the invention has preferably two connecting bodies, which are connected with the reinforcement elements on oppositely lying side surfaces of the reinforcement element.

In a further development of the invention, the pressure difference measuring cell, especially the measuring cell platform, comprises silicon.

In a further development of the invention, the reinforcement elements comprise a ceramic material, especially aluminum nitride (AlN) and silicon nitride ($Si_3N_4$), or other nitride ceramics, whose expansion coefficient is, for instance, not more than 5 ppm/K. The smaller the deviation of the coefficient of thermal expansion of the material of the reinforcement elements from that of the measuring cell platform, especially silicon, the better.

In a further development of the invention, the reinforcement elements are joined with the measuring cell platform by means of a glass solder.

In a further development, the reinforcement elements have, in each case, a pressure tube connection area, which extends essentially perpendicularly to the reinforcement area, wherein the pressure duct extends from the pressure tube connection area to the reinforcement area.

In a further development of the invention, the reinforcement elements are, in each case, connected with a pressure tube, which, in turn, is connected to a hydraulic measuring aid, wherein the contribution of the pressure tubes to the effective stiffness K amounts to less than 2% of K, especially less than 1% of K and especially preferably less than 0.1% of K. In such case, the longitudinal axes of the pressure tubes, especially straight pressure tubes, extends preferably perpendicularly to the central axis of the pressure difference measuring cell.

In a further development of the invention, the reinforcement elements are connected with the pressure tubes by means of a glass solder, a metal solder or adhesive.

In a further development of the invention, the reinforcement elements have at least sectionally an electrically conducting coating, for example, in the form of conductive traces, via which an electrical transducer of the pressure difference measuring cell is connected with an electronic circuit. The transducer can especially comprise a capacitive transducer and/or a (piezo-)resistive transducer. The electrical connection between the conductive traces and the transducer can especially be produced by conductive adhesive.

BRIEF DESCRIPTION OF THE DRAWINGS

The invention will now be explained based on the example of an embodiment illustrated in the drawing, the figures of which show as follows.

DETAILED DISCUSSION IN CONJUNCTION WITH THE DRAWINGS

Figure 1:
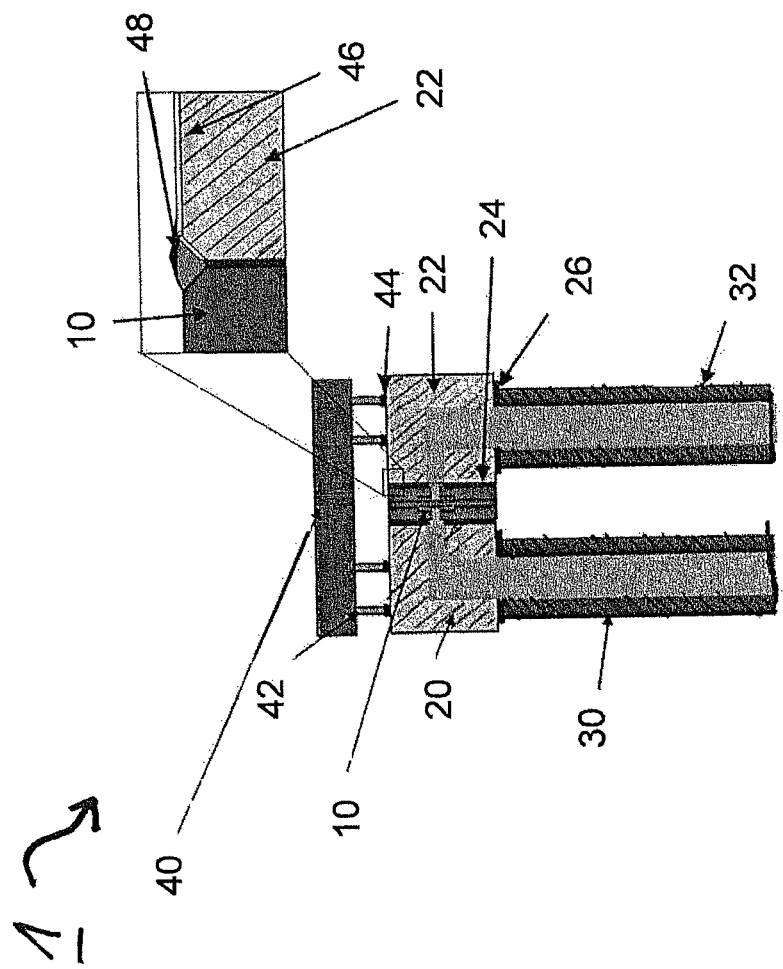
FIG. 1 is a schematic longitudinal section through a first example of an embodiment of an pressure difference sensor of the invention.
Figure 2:
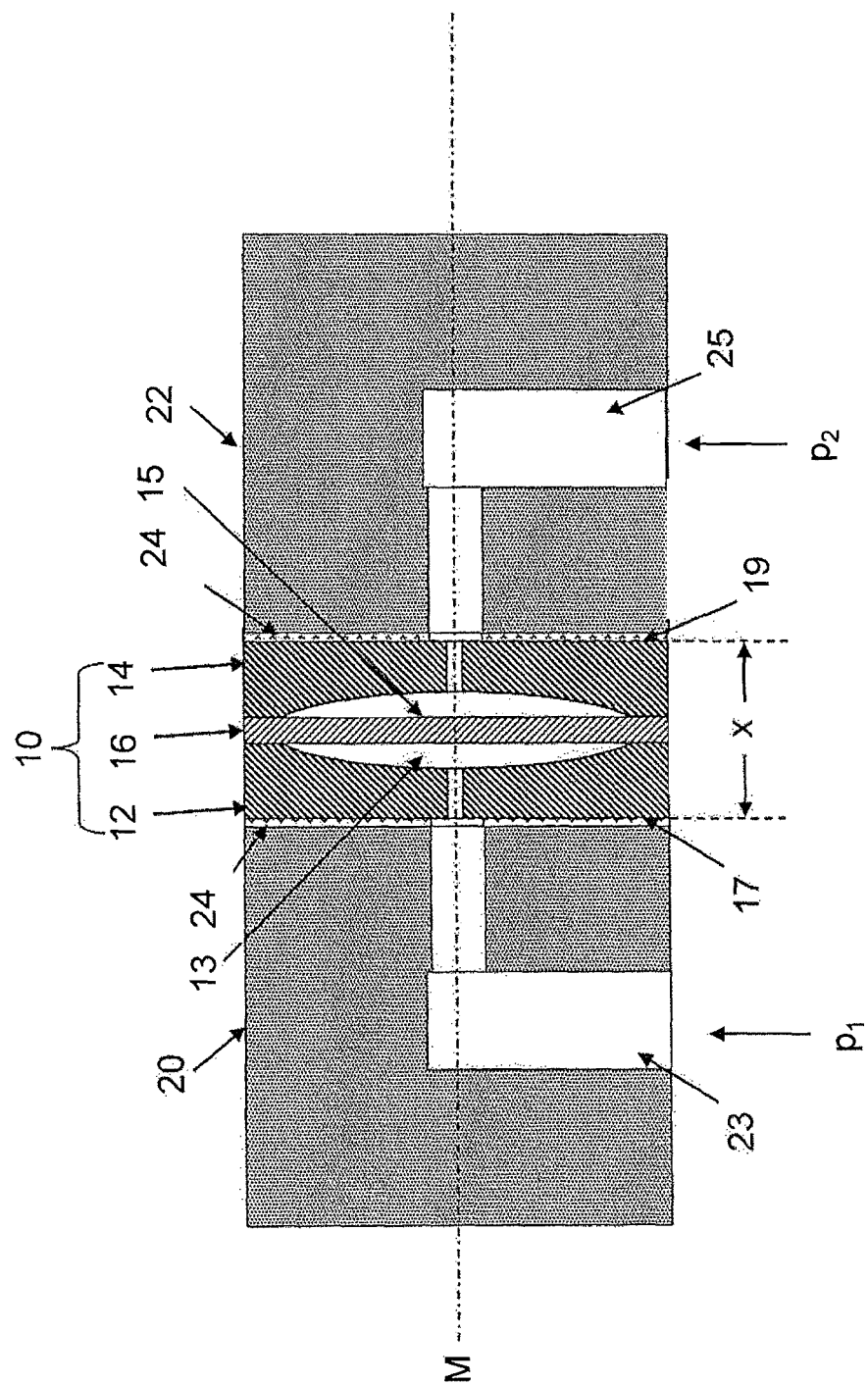
FIG. 2 is a schematic longitudinal section through a pressure difference measuring cell and a reinforcement element of an example of an embodiment of a pressure difference sensor of the invention.

The pressure difference sensor 1 shown in FIGS. 1 and 2 includes a pressure difference measuring cell 10 of silicon with a capacitive transducer. Pressure difference measuring cell 10 includes a measuring cell platform, which has a first platform portion 12 and a second platform portion 14, between which is arranged a measuring membrane 16. The measuring membrane has a thickness of, for example, a few 10 µm to 100 µm. The thickness of the platform portions amounts, for example, to a few 100 µm. The platform portions have an area parallel to the measuring membrane in the order of magnitude, for example, 20 to 30 square millimeter.

Measuring membrane 16 is joined with the platform portions 12, 14, for example, by fusion bonding. In measurement operation, the pressure difference measuring cell 10 is supplied with a first pressure p1 and a second pressure p2, wherein these pressures are fed to respective measuring chambers 13, 15, which are formed between the measuring membrane 16 and the platform portions 12, 14. This leads to deflection of the measuring membrane 16 as a function of the pressure difference p1-p2 to be determined. In the case of large pressures, this can, however, lead to a bulging of the measuring chambers 13, 15, so that a separation x between mounting surfaces 17, 19 facing away from one another on the external faces of the platform portions 12, 14 would without countermeasures increase with rising pressure. The separation x is especially measured along a central axis M of the pressure difference measuring cell. During bulging of the measuring chambers 13, 15, stress concentrations occur between the measuring membrane and the platform portions, so that the measuring cell can burst. In order to prevent this, reinforcement elements 20, 22 are secured pressure-bearingly and pressure-tightly on the mounting surfaces 17, 19 by means of a glass solder layer 24.

In this way, the platform portions are sufficiently stiffened, that a bulging of the measuring chambers is prevented. The reinforcement elements comprise, especially, aluminum nitride or silicon nitride. In the direction of the central axis M, their thickness amounts to a few millimeter.

Extending from the reinforcement elements 20, 22 are respective pressure ducts 23, 25 in respective tubes 30, 32. Pressure ducts 23, 25 communicate with the respective measuring chambers 13, 15, in order to be able to supply the latter by means of pressure transfer liquid with the pressures p1, p2.

The reinforcement elements 20, 22 are connected via an adhesive or metal solder with the metal pressure tubes 30, 32, especially capillary tubes, which communicate, in turn, with a hydraulic measuring aid (not shown), via which the pressures to be measured are supplied to the pressure tubes. The pressure tubes are especially essentially longer than their diameter, so that they provide, at most, a negligible contribution to an effective stiffness K, which is defined as $K=1/(dx/dp)$.

For ascertaining the stiffness K, the two measuring chambers 13, 15 are supplied with the same pressure p.

For operating an electrical transducer (not shown), the pressure difference measuring cell 10 is provided here with a circuit 40, which is connected via contact pins 42 with conductive adhesive dots on contact fields and conductive traces 46 on the reinforcement elements. The contact fields and conductive traces 46 on their part, in turn, by means of conductive adhesive dots 48 contact surfaces of the pressure difference measuring cell in the edge region the platform portions 12, 14 near the mounting surfaces 17, 19. The conductive traces and contact surfaces 46 on the reinforcement elements 20, 22, comprise especially metal layers.

The invention claimed is:

1. A pressure difference sensor, comprising:
a pressure difference measuring cell, which has a measuring cell platform having a first measuring chamber and a second measuring chamber in its interior,
said measuring chambers are separated from one another by a measuring membrane,
said measuring cell platform has on a first measuring chamber side a first planar mounting surface facing away from the measuring membrane, and on a second measuring chamber side a second planar mounting surface facing away from the measuring membrane,
said measuring chambers have, in each case, a measuring chamber opening to the first, respectively second, planar mounting surface, via which they are contactable with a first, respectively second, pressure,
said measuring membrane is elastically deformable as a function of a difference between the first pressure in said first measuring chamber and the second pressure in said second measuring chamber;
a transducer for providing a signal dependent on the deformation of said measuring membrane;
a first reinforcement element having a first planar reinforcement area, wherein there extends through said first planar reinforcement element a first pressure duct, which opens into the first reinforcement area and communicates with the first measuring chamber opening, said first reinforcement area is connected pressure bearingly with said first mounting surface; and
a second reinforcement element having a second planar reinforcement area, wherein there extends through said second planar reinforcement element a second pressure duct, which opens into said second reinforcement area and communicates with said second measuring chamber opening, said second reinforcement area is connected pressure bearingly with said second mounting surface, wherein:
a deflection of said first and said second mounting surfaces due to a pressure loading of said first and said second measuring chambers is lessened by said reinforcement elements to no greater than 25%, especially no greater than 10%, preferably no greater than 5%, further preferably no greater than 2% and especially preferably no greater than 1% of the deflection of said mounting surfaces of a pressure difference measuring cell of same type without connection with said reinforcement elements;
at least 50%, preferably at least 70%, further preferably at least 85% and especially preferably at least 95% of an effective stiffness K=1/(dx/dp) of said reinforcement element connected by the pressure difference measuring cell is provided only by these connections of said reinforcement element with said measuring cell platform without additional connections between said reinforcement elements in a parallel branch, wherein x is the separation between said first mounting surface and said second mounting surface having the greatest pressure dependence dx/dp.

2. The pressure difference sensor as claimed in claim 1, wherein:
there are no additional, direct mechanical connections between said reinforcement elements contributing more than 5%, especially more than 2%, to the stiffness K.

3. The pressure difference sensor as claimed in claim 1, further comprising:
at least one additional, direct mechanical connection between said reinforcement elements by means of a connecting body, wherein:
said connecting body has a connecting surface, which is connected with both said reinforcement elements, said connecting surface is essentially perpendicular to said mounting surfaces and said reinforcement areas.

4. The pressure difference sensor as claimed in claim 1, wherein:
the pressure difference measuring cell comprises silicon.

5. The pressure difference sensor as claimed in claim 1, wherein:
said reinforcement elements comprise a ceramic material, especially aluminum nitride (AlN) and silicon nitride (Si3N4), or other nitride ceramics, whose expansion coefficient is, for instance, no greater than 5 ppm/K.

6. The pressure difference sensor as claimed in claim 1, wherein:
said reinforcement elements are joined with said measuring cell platform by means of a glass solder.

7. The pressure difference sensor as claimed in claim 1, wherein:
said reinforcement elements have, in each case, a pressure tube connection area, which extends essentially perpendicularly to said reinforcement area; and
said pressure duct extends from the pressure tube connection area to said reinforcement area.

8. The pressure difference sensor as claimed in claim 1, wherein:
said reinforcement elements are, in each case, connected with a pressure tube, which, in turn, is connected to a hydraulic measuring aid; and
the contribution of said pressure tubes to the effective stiffness K amounts to less than 2% of K, especially less than 1% of K and especially preferably less than 0.1% of K.

9. The pressure difference sensor as claimed in claim 8, wherein:
said reinforcement elements are connected with said pressure tubes by means of a glass solder, a metal solder or adhesive.

10. The pressure difference sensor as claimed in claim 1, wherein:
said reinforcement elements have at least sectionally an electrically conducting coating, via which an electrical transducer of the pressure difference measuring cell is connected with an electronic circuit.

\* \* \* \* \*